(12) United States Patent
Wideman et al.

(10) Patent No.: US 6,528,592 B1
(45) Date of Patent: Mar. 4, 2003

(54) SILICA REINFORCED RUBBER COMPOSITION WHICH CONTAINS NON-SILANE COUPLING AGENT AND ARTICLE OF MANUFACTURE, INCLUDING A TIRE, HAVING AT LEAST ONE COMPONENT COMPRISED OF SUCH RUBBER COMPOSITION

(75) Inventors: Lawson Gibson Wideman, Hudson, OH (US); Kevin James Pyle, Uniontown, OH (US); Richard Robinson Smith, Cuyahoga Falls, OH (US); Paul Harry Sandstrom, Tallmadge, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 70 days.

(21) Appl. No.: 09/661,707

(22) Filed: Sep. 14, 2000

(51) Int. Cl.$^7$ .............................................. C08F 236/02
(52) U.S. Cl. .................... 525/332.1; 524/495; 524/442; 525/333.1; 525/333.2; 525/384; 525/385; 525/386; 525/342; 525/343
(58) Field of Search ................. 525/332.1, 332.3, 525/332.6, 333.1, 333.2, 333.5, 342, 343; 524/495, 492

(56) References Cited

U.S. PATENT DOCUMENTS

| | | | |
|---|---|---|---|
| 4,574,140 A | * | 3/1986 | Sandstrom et al. ......... 525/123 |
| 4,579,911 A | * | 4/1986 | D'Sidocky et al. ......... 525/223 |
| 5,094,829 A | | 3/1992 | Krivak et al. ............... 423/339 |
| 5,621,044 A | * | 4/1997 | Wang .......................... 525/193 |
| 5,679,728 A | | 10/1997 | Kawazura et al. ........... 523/215 |
| 5,708,069 A | | 1/1998 | Burns et al. ................. 524/403 |
| 5,719,208 A | * | 2/1998 | Wideman et al. ............ 523/216 |
| 5,750,610 A | | 5/1998 | Burns et al. ................. 524/434 |
| 5,789,514 A | | 8/1998 | Burns et al. ................... 528/12 |
| 5,914,364 A | * | 6/1999 | Cohen et al. ................ 524/494 |
| 6,028,137 A | | 2/2000 | Mahmud et al. ............. 524/496 |
| 6,040,389 A | * | 3/2000 | Wideman et al. ......... 525/332.3 |
| 6,300,421 B1 | * | 10/2001 | Blok et al. ................ 525/331.1 |

FOREIGN PATENT DOCUMENTS

| | | | |
|---|---|---|---|
| EP | 04727300 | 5/1991 | .......... A61K/6/083 |
| EP | 0849321 | 6/1998 | .............. C08L/9/00 |
| EP | 0864606 | 9/1998 | .............. C08L/9/00 |
| EP | 0995775 | 4/2000 | ........... C08L/21/00 |

OTHER PUBLICATIONS

European Search Report.

* cited by examiner

*Primary Examiner*—David W. Wu
*Assistant Examiner*—Rip Lee
(74) *Attorney, Agent, or Firm*—Henry C. Young, Jr.

(57) ABSTRACT

This invention relates to a conjugated diene-based rubber composition reinforced with particulate silica-based reinforcement together with 2-hydroxyethyl methacrylate (a non-silane coupling agent) or a combination of 2-hydroxyethyl methacrylate and bis(3-trialkoxysilylalkyl) polysulfide having an average of from 2 to 2.6, or from 3.5 to 4, sulfur atoms in its polysulfidic bridge to aid in the reinforcement of the rubber composition with a particulate silica-based material and an article of manufacture, including a tire, having at least one component comprised of such rubber composition.

18 Claims, No Drawings

SILICA REINFORCED RUBBER COMPOSITION WHICH CONTAINS NON-SILANE COUPLING AGENT AND ARTICLE OF MANUFACTURE, INCLUDING A TIRE, HAVING AT LEAST ONE COMPONENT COMPRISED OF SUCH RUBBER COMPOSITION

FIELD OF THE INVENTION

This invention relates to a conjugated diene-based rubber composition reinforced with particulate silica-based reinforcement together with 2-hydroxyethyl methacrylate (a non-silane coupling agent) or a combination of 2-hydroxyethyl methacrylate and bis(3-trialkoxysilylalkyl) polysulfide having an average of from 2 to 2.6, or from 3.5 to 4, sulfur atoms in its polysulfidic bridge to aid in the reinforcement of the rubber composition with a particulate silica-based material and an article of manufacture, including a tire, having at least one component comprised of such rubber composition.

BACKGROUND FOR THE INVENTION

For various applications utilizing rubber compositions, carbon black and/or synthetic amorphous silica-based materials are conventionally used as particulate reinforcing fillers for the elastomer(s) of the rubber composition(s).

Often a coupling agent is used together with the silica in order to couple, or otherwise enhance, its elastomer reinforcement effect for the elastomer(s) and such use of a coupling agent is well known to those having skill in such art.

Such coupling agents might also be sometimes referred to as being adhesive agents insofar as use thereof to enhance reinforcement of various elastomer compositions with various silica-based materials such as, for example, aggregates of precipitated silica.

Historically, such adhesive agents are conventionally silane-based compounds which have one moiety (a silane-based moiety such as, for example, an alkoxysilane moiety) which is reactive with hydroxyl groups (e.g. silanol groups) on the surface of a synthetic amorphous silica and having another moiety (e.g. a polysulfide bridge) which becomes interactive with a conjugated diene-based elastomer.

For example, bis-(3-triethoxysilylpropyl) polysulfides having an average of from 2 to 4 connecting sulfur atoms in their polysulfidic bridge are often used as a coupling agent (or adhesive) to enhance coupling of synthetic amorphous silicas, such as aggregates of precipitated silica, to various conjugated diene-based elastomers. Use of such coupling agents is well known to those having skill in such art.

However, use of silane-containing coupling agents, or adhesives, which rely upon a reaction between the silane and hydroxyl groups (e.g. silanol groups) on the surface of a synthetic amorphous silica typically releases an alcohol as a by product of such reaction. For example, a reaction of a bis-(3-triethoxysilylpropyl) polysulfide coupling agent with silanol groups on the surface of a silica material releases ethanol as a byproduct.

For various purposes, it may be desired to reduce such alcohol evolution created by an in situ reaction of said reactants, with an associated alcohol formation, within an elastomer host during the mixing of a rubber composition which contains such reactants.

In the description of this invention, the term "phr" is used to designate parts by weight of a material per 100 parts by weight of elastomer. In the further description, the terms "rubber" and "elastomer" may be used interchangeably unless otherwise mentioned. The terms "vulcanized" and "cured" may be used interchangeably, as well as "unvulcanized" or "uncured", unless otherwise indicated.

SUMMARY AND PRACTICE OF THE INVENTION

In accordance with one aspect of this invention, a rubber composition is provided which comprises (A) 100 parts by weight of at least one diene-based elastomer, (B) about 25 to about 100, optionally about 35 to about 90, phr of particulate reinforcing filler comprised of about zero to about 100, alternately about 10 to about 70, phr of synthetic amorphous silica aggregates and, correspondingly, from zero to about 75, alternately about 10 to about 60 phr of at least one of carbon black and silica treated carbon black having domains of silica on its surface; wherein said silica aggregates and said silica domains on the surface of said treated carbon black contain hydroxyl groups (e.g. silanol groups) on their surface; and (C) 0.5 to 10, preferably 1 to 7, phr of a coupling agent as 2-hydroxyethyl methacrylate or a combination of 2-hydroxyethyl methacrylate and an alkoxysilyl polysulfide material in a weight ratio of said methacrylate to said polysulfide material is in a range of from about 1/2 to about 2/1 and wherein said alkoxysilyl polysulfide is of the general formula (I):

$$(OR)_3\text{—Si—R'—S}_x\text{—R'—Si—}(OR)_3 \quad \text{(I)}$$

wherein R is selected from at least one of methyl and ethyl radicals and R' is an alkylene radical having from 1 to 12 carbon atoms, preferably selected from ethylene, propylene and butylene radicals and x is a value of from 2 to 6 and an average of from 2 to 2.6 or from 3.5 to 4;

wherein said methacrylate and said alkoxysilyl polysulfide material of general formula (I) are mixed with said elastomer(s), according to one or more of the following:

(1) mixing said 2-hydroxyethyl methacrylate or both of said 2-hydroxyethyl methacrylate and said alkoxysilyl polysulfide material with said elastomer(s) and said particulate reinforcement in an internal rubber mixer, (2) mixing said 2-hydroxyethyl methacrylate or a combination of both of said 2-hydroxyethyl methacrylate and said alkoxysilyl polysulfide material with said elastomer(s) and said particulate reinforcement in an internal rubber mixer, wherein at least one of said 2-hydroxyethyl methacrylate and said alkoxysilyl polysulfide material has been pre-reacted with said carbon black to form a carbon black composite thereof, (3) mixing said 2-hydroxyethyl methacrylate or a combination of both of said 2-hydroxyethyl methacrylate and said alkoxysilyl polysulfide material with said elastomer(s) and said particulate reinforcement in an internal rubber mixer, wherein at least one of said 2-hydroxyethyl methacrylate and said alkoxysilyl polysulfide material has been pre-reacted with said silica treated carbon black to form a silica treated carbon black composite thereof, (4) mixing said 2-hydroxyethyl methacrylate or a combination of both of said 2-hydroxyethyl methacrylate and said alkoxysilyl polysulfide material with said elastomer(s) and said particulate reinforcement in an internal rubber mixer, wherein at least one of said 2-hydroxyethyl methacrylate and said alkoxysilyl polysulfide material has been pre-reacted with
  (a) a synthetic precipitated silica or
  (b) an aqueous dispersion of colloidal silica particles from which a precipitated silica is recovered to form a silica composite thereof,
(5) mixing said 2-hydroxyethyl methacrylate and said alkoxysilyl polysulfide material with said elastomer(s) and said particulate reinforcement in an internal rubber mixer, according to any of said steps (1), (2), (3) or (4) wherein said particulate reinforcement includes at least one of said synthetic precipitated silica aggregates and said silica treated carbon black which has been pre-hydrophobated prior to mixing with said elastomers with an alkylsilane of the general formula (II):

$$X_n\text{—}Si\text{—}R_{4-n} \quad (II)$$

wherein X is a radical selected from alkoxy radicals having from 1 through 3 carbon atoms, preferably selected from methoxy and ethoxy radicals, and from halogen radicals selected from at least one of chlorine and bromine radicals, preferably a chlorine radical; R is an alkyl radical having from 1 to 18 carbon atoms, preferably from 1 through 4 carbon atoms and more preferably selected from methyl and ethyl groups; and n is an integer of 1 through 3,
(6) mixing said 2-hydroxyethyl methacrylate or a combination of both of said 2-hydroxyethyl methacrylate and said alkoxysilyl polysulfide material with said elastomer(s) and an alkylsilane of the said Formula (II) with said elastomer(s) and particulate reinforcement in an internal rubber mixer, and
(7) mixing said 2-hydroxyethyl methacrylate or a combination of both of said 2-hydroxyethyl methacrylate, said alkoxysilyl polysulfide material and said alkylsilane of Formula (II) with said elastomer(s) and said particulate reinforcement in an internal rubber mixer, wherein said 2-hydroxyethyl methacrylate, said alkoxysilyl polysulfide material and said alkylsilane of Formula (II) have all been pre-reacted with
  (a) a synthetic precipitated silica or
  (b) an aqueous dispersion of colloidal silica particles from a which a precipitated silica is recovered to form a silica composite thereof.

In further accordance with this invention, an article of manufacture is provided which contains at least one component comprised of the rubber composition of this invention.

In additional accordance with this invention, a tire is provided which contains at least one component comprised of the rubber composition of this invention.

In further accordance with this invention, a tire is provided having a tread comprised of the rubber composition of this invention.

In practice, it is desired that the said 2-hydroxyethyl methacrylate or a combination of both of said 2-hydroxyethyl methacrylate, or composite thereof with at least one of said of silica, silica treated carbon black, alkylsilane of Formula (II) and carbon black, is preferably mixed with said elastomer(s) and particulate reinforcement after mixing therewith said alkoxysilyl polysulfide material of Formula (I), or composite thereof with at least one of silica, silica treated carbon black, alkylsilane of Formula (II) and carbon black.

Accordingly, for the practice of this invention where a combination of the said alkoxysilyl polysulfide material of Formula (I) and said 2-hydroxyethyl methacrylate is used, said alkoxysilyl polysulfide material is preferably blended with said elastomer(s) prior to said 2-hydroxyethyl methacrylate.

The synthetic amorphous silica may be selected from aggregates of precipitated silica, which is intended to include precipitated aluminosilicates as a co-precipitated silica and aluminum, and from fumed (pyrogenically formed) silica.

Such precipitated silica is, in general, well known to those having skill in such art. For example, such precipitated silica may be precipitated by controlled addition of an acid such as, for example, hydrochloric acid or sulfuric acid, to a basic solution (e.g. sodium hydroxide) of a silicate, for example, sodium silicate, usually in the presence of an electrolyte, for example, sodium sulfate. Primary, colloidal silica particles typically form during such process which quickly coalesce to form aggregates of such primary particles and which are then recovered as precipitates by filtering, washing the resulting filter cake with water or an aqueous solution, and drying the recovered precipitated silica. Such method of preparing precipitated silica, and variations thereof, are well known to those having skill in such art.

The silica treated carbon black relates to carbon black which contains domains of exposed silica on the surface of the carbon black. Such carbon black may be prepared, for example, by reaction of an alkyl silane (e.g. an alkoxy silane) with carbon black or by co-fuming carbon black and silica at an elevated temperature. For example, see U.S. Pat. Nos. 5,679,728 and 6,028,137.

It is preferred that an in situ reaction of said 2-hydroxyethyl methacrylate or a combination of both of said 2-hydroxyethyl methacrylate and said alkoxysilyl polysulfide of Formula (I) within the elastomer host is accomplished with a reduced evolution of an alcohol as compared to using the said polysulfide material without the methacrylate material. Indeed, by the inherent chemistry of a conventional reaction of said 2-hydroxyethyl methacrylate and hydroxyl groups contained on the surface of said silica material, water a byproduct of the reaction is evolved instead of an alcohol.

In the further practice of the invention, the aforesaid in situ reaction of said 2-hydroxyethyl methacrylate, said polysulfide material and a silica material within the elastomer host via said internal rubber mixing process is accomplished wherein said silica material is a precipitated silica and/or silica-containing carbon black which is hydrophobated prior to its addition to the elastomer (pre-hydrophobated). Such in situ reaction is considered herein to be important as to both the process of mixing and reacting of the 2-hydroxyethyl methacrylate, said polysulfide material, and pre-hydrophobated silica material as to a resulting product thereof. In particular, is it considered herein that pre-hydrophobation of the silica material, particularly with an alkyl silane of the general formula (II) enables a more efficient mixing, or processing, of it within the elastomer host in that such pre-hydrophobation of the silica material (A) renders it more compatible with the diene-based elastomer and (B) substantially reduces a tendency for a precipitated silica to agglomerate with itself within the elastomer host.

Moreover, the accompanying in situ reaction of the 2-hydroxyethyl methacrylate and said polysulfide material now enables both the more efficient mixing coupled with the associated reaction with only a minimal evolution of an alcohol, preferably no evolution of alcohol from the rubber composition.

Representative examples of the said polysulfide material of Formula (I) are, for example bis(3-trialkoxysilylalkyl) polysulfides having from 2 to 6, with an average of from 2 to 2.6, or from 3.5 to 4, sulfur atoms in its polysulfidic bridge. Exemplary of such material is a bis(3-triethoxysilylpropyl) polysulfide material with the average of from 2 to 2.6, or from 3.5 to 4, sulfur atoms in its polysulfidic bridge the polysulfide material with an average of from 2 to 2.6 connecting sulfur atoms is considered herein as being a disulfide type of material which releases only a limited amount of free sulfur during the mixing thereof with rubber.

In the practice of this invention, said pre-hydrophobated precipitated silica aggregates may be pre-hydrophobated, for example, by treating silica in an aqueous colloidal form thereof with said alkylsilane of Formula (II).

The hydrophobated precipitated silica aggregates might be recovered, for example, from said treated colloidal silica, for example as a treated silica hydrosol, with the aid of acid addition to the treated colloidal silica (for example, sulfuric acid or hydrochloric acid) followed by water washing and drying the recovered hydrophobated silica as a hydrophobated silica gel or as a hydrophobated precipitated silica. While this invention is not intended to be directed to a specific preparation technique (preparation of silica hydrosols, recovery of silica gels and precipitated silicas, etc.) of the pre-hydrophobated precipitated silica itself, for education purposes in this regard, reference might be made to the aforesaid Condensed Chemical Dictionary and U.S. Pat. No. 5,094,829 as well as U.S. Pat. Nos. 5,708,069, 5,789,514 and 5,750,610 for a more detailed discussion.

Representative alkylsilanes of Formula (I) are, for example, trichloro methyl silane, dichloro dimethyl silane, chloro trimethyl silane, trimethoxy methyl silane, dimethoxy dimethyl silane, methoxy trimethyl silane, trimethoxy propyl silane, trimethoxy octyl silane, trimethoxy hexadecyl silane, dimethoxy dipropyl silane, triethoxy methyl silane, triethoxy propyl silane, triethoxy octyl silane, and diethoxy dimethyl silane.

In practice, various diene-based elastomers may be used such as, for example, homopolymers and copolymers of monomers selected from isoprene and 1,3-butadiene and copolymers of at least one diene selected from isoprene and 1,3-butadiene and a vinyl aromatic compound selected from styrene and alphamethyl styrene, preferably styrene.

Representative of such conjugated diene-based elastomers are, for example, cis 1,4-polyisoprene (natural and synthetic), cis 1,4-polybutadiene, styrene/butadiene copolymers (aqueous emulsion polymerization prepared and organic solvent solution polymerization prepared), medium vinyl polybutadiene having a vinyl 1,2-content in a range of about 15 to about 90 percent, isoprene/butadiene copolymers, styrene/isoprene/butadiene terpolymers. Tin coupled elastomers may also be used, such as, for example, tin coupled organic solution polymerization prepared styrene/butadiene co-polymers, isoprene/butadiene copolymers, styrene/isoprene copolymers, polybutadiene and styrene/isoprene/butadiene terpolymers.

In the further practice of this invention, particulate reinforcement for the rubber composition may be particulate synthetic amorphous silica, or a combination of carbon black and amorphous silica (exclusive of silica treated carbon black), usually of an amount in a range of about 25 to about 100 alternately about 35 to about 90, phr. If a combination of such carbon black and silica is used, usually at least about 5 phr of carbon black and at least 10 phr of silica are used. For example, a weight ratio of silica to carbon black ranging from about 1/5 to 5/1 might be used.

Commonly employed synthetic amorphous silica, or siliceous pigments, used in rubber compounding applications can be used as the silica in this invention, including precipitated siliceous pigments and fumed (pyrogenic) silica wherein aggregates of precipitated silicas are usually preferred.

The precipitated silica aggregates preferably employed in this invention are precipitated silicas such as, for example, those obtained by the acidification of a soluble silicate, e.g., sodium silicate and may include coprecipitated silica and a minor amount of aluminum.

Such silicas might usually be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society,* Volume 60, Page 304 (1930).

The silica may also be typically characterized by having a dibutylphthalate (DBP) absorption value in a range of about 50 to about 400 cm3/100 g, and more usually about 100 to about 300 $cm^3/100$ g.

Various commercially available precipitated silicas may be considered for use in this invention such as, only for example herein, and without limitation, silicas from PPG Industries under the Hi-Sil trademark with designations Hi-Sil 210, Hi-Sil 243, etc; silicas from Rhodia as, for example, Zeosil 1165MP and Zeosil 165GR, silicas from Degussa AG with, for example, designations VN2 and VN3, as well as other grades of silica, particularly precipitated silicas, which can be used for elastomer reinforcement.

It is readily understood by those having skill in the art that the rubber composition would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins, silicas, and plasticizers, fillers, pigments, fatty acid, zinc oxide, waxes, antioxidants and antiozonants, peptizing agents and reinforcing materials such as, for example, carbon black. As known to those skilled in the art, depending on the intended use of the sulfur vulcanizable and sulfur vulcanized material (rubbers), the additives mentioned above are selected and commonly used in conventional amounts.

Typical amounts of tackifier resins, if used, comprise about 0.5 to about 10 phr, usually about 1 to about 5 phr. Typical amounts of processing aids comprise about 1 to about 50 phr. Such processing aids can include, for example, aromatic, napthenic, and/or paraffinic processing oils. Typical amounts of antioxidants comprise about 1 to about 5 phr. Representative antioxidants may be, for example, diphenyl-p-phenylenediamine and others, such as, for example, those disclosed in *The Vanderbilt Rubber Handbook* (1978), Pages 344 through 346. Typical amounts of antiozonants comprise about 1 to 5 phr. Typical amounts of fatty acids, if used, which can include stearic acid comprise about 0.5 to about 3 phr. Typical amounts of zinc oxide comprise about 1 to about 10 phr. Typical amounts of waxes comprise about 1 to about 5 phr. Often microcrystalline waxes are used. Typical amounts of peptizers comprise about 0.1 to about 1 phr.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to about 4 phr, or even, in some circumstances, up to about 8 phr.

Accelerators are used to control the time and/or temperature required for vulcanization and to improve the properties of the vulcanizate. In one embodiment, a single accelerator system may be used, i.e., primary accelerator. Conventionally and preferably, a primary accelerator(s) is used in total amounts ranging from about 0.5 to about 4, preferably about 0.8 to about 1.5, phr. In another embodiment, combinations of a primary and a secondary accelerator might be used with the secondary accelerator being used in smaller amounts (of about 0.05 to about 3 phr) in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The presence and relative amounts of the above additives are not considered to be an aspect of the present invention, unless otherwise indicated herein, which is more primarily directed to the utilization a non-silane containing coupling agent for enhancing reinforcement of a conjugated diene-based elastomer with a particulate synthetic amorphous silica material which contains hydroxyl groups (e.g. silanol groups) on its surface.

The mixing of the rubber composition can be accomplished by methods known to those having skill in the rubber mixing art. For example, the ingredients are typically mixed in at least two stages, namely, at least one non-productive stage followed by a productive mix stage. The final curatives are typically mixed in the final stage which is conventionally called the "productive" mix stage in which the mixing typically occurs at a temperature, or ultimate temperature, lower than the mix temperature(s) than the preceding non-productive mix stage(s). The rubber, and fillers such as silica and silica treated carbon black and adhesive agent, are mixed in one or more non-productive mix stages. The terms "non-productive" and "productive" mix stages are well known to those having skill in the rubber mixing art.

The following examples are presented to illustrate the invention and are not intended to be limiting. The parts and percentages are by weight unless otherwise designated.

EXAMPLE I

Rubber compositions comprised of cis 1,4-polybutadiene and styrene/butadiene elastomers are prepared which contain a coupling agent as 2-hydroxyethyl methacrylate and a coupler as bis(3-triethoxysilylpropyl) disulfide and identified herein as Samples D and E.

Three other rubber compositions are prepared of such elastomers but without said coupling agents. In particular, Control Samples B and C contained the bis(3-triethoxysilylpropyl) disulfide, whereas Control Sample A contained no coupling agent.

Control Sample C differs from Control Sample B by using only half of the bis(3-triethoxysilylpropyl) disulfide.

Samples D and E differ only in the order of addition of the bis(3-triethoxysilylpropy) disulfide and the 2-hydroxyethyl methacrylate, namely that, for Sample D, the bis(3-triethoxysilylpropyl) disulfide was first added to the rubber composition.

All of the Sample elastomer compositions were prepared by blending the elastomer compositions, in an internal rubber mixer, for about six minutes to a temperature of about 170° C. (The non-productive mixing step.) The resulting elastomer compositions were then mixed in an internal rubber mixer for about two minutes to a temperature of about 105° C. degrees during which the sulfur curatives were blended. (The productive mixing step.)

For Sample D, the bis(3-triethoxysilylpropyl) disulfide was added in the first non-productive mixing stage and the 2-hydroxyethyl methacrylate added in the second non-productive mixing stage.

For Sample E, the 2-hydroxyethyl methacrylate was added in the first non-productive mixing stage and the bis-(3-triethoxysilylpropyl) disulfide was added in the second non-productive mixing stage.

The aforesaid mixing procedure for preparation of Sample D is preferred over the mixing procedure for Sample E.

The elements of Control Samples A, B and C and Samples D and E are shown in the following Table 1.

TABLE 1

| Material | Sample A Control | Sample B Control | Sample C Control | Sample D | Sample E |
|---|---|---|---|---|---|
| Non-Productive Mixing Steps | | | | | |
| Cis 1,4-polybutadiene rubber[1] | 30 | 30 | 30 | 30 | 30 |
| Styrene/butadiene rubber[2] | 70 | 70 | 70 | 70 | 70 |
| Silica[3] | 70 | 70 | 70 | 70 | 70 |
| Processing oil[4] | 28 | 28 | 28 | 28 | 28 |
| Zinc oxide | 2.5 | 2.5 | 2.5 | 2.5 | 2.5 |
| Stearic acid | 3 | 3 | 3 | 3 | 3 |
| Non-silane coupler (50% active)[5] | 0 | 0 | 0 | 0 | 5.5 |
| Silane coupler (50% active)[6] | 0 | 11 | 5.5 | 5.5 | 0 |
| Productive Mixing Step | | | | | |
| Accelerator(s)[7] | 1.7 | 1.7 | 1.7 | 1.7 | 1.7 |
| Accelerator[8] | 2 | 2 | 2 | 2 | 2 |
| Sulfur | 1.6 | 1.6 | 1.6 | 1.6 | 1.6 |
| Antioxidant[9] | 1 | 1 | 1 | 1 | 1 |
| Non-silane coupler (50% active) | 0 | 0 | 0 | 0 | 0 |
| Silane coupler (50% active) | 0 | 0 | 0 | 0 | 5.5 |

TABLE 1-continued

| | Parts | | | | |
|---|---|---|---|---|---|
| Material | Sample A Control | Sample B Control | Sample C Control | Sample D | Sample E |

[1]Cis 1,4-polybutadiene rubber obtained as Budene 1207 from The Goodyear Tire & Rubber Company
[2]Styrene/butadiene rubber obtained as SLF 1216 from The Goodyear Tire & Rubber Company
[3]Obtained as Hi-Sil ® 210 from the PPG Industries
[4]Aromatic rubber processing oil
[5]2-Hydroxyethyl methacrylate obtained from the Aldrich Company and thereafter dispersed on carbon black on a 50/50 weight basis.
[6]Bis (3-triethoxysilylpropy) disulfide as a 50/50 composite with carbon black and therefore 50 percent active, obtained from the Degussa company
[7]Sulfenamide type and n-alkyl mercaptobenzothiazole sulfenamide
[8]Diphenylguandine
[9]Para-phenylenediamine type Various physical properties of the Samples of Table 1 were evaluated and reported in the following Table 2.

TABLE 2

| | Parts | | | | |
|---|---|---|---|---|---|
| Properties | Sample A Control | Sample B Control | Sample C Control | Sample D | Sample E |
| Non-silane coupler | 0 | 0 | 0 | 5.5 | 5.5 |
| Stage of addition | — | — | — | 2 | 1 |
| Silane coupler | 0 | 11 | 5.5 | 5.5 | 5.5 |
| Stage of Addition | — | 1 | 1 | 1 | 2 |
| Rheometer 150° C. | | | | | |
| Maximum torque | 30.4 | 22.2 | 17.2 | 19.2 | 17.8 |
| Minimum torque | 7.2 | 4 | 3 | 3.4 | 3 |
| Delta torque | 23.2 | 18.2 | 14.2 | 15.8 | 14.8 |
| T90 (min.) | 38.5 | 17 | 12.1 | 14.2 | 16.5 |
| Modulus/Tensile/Elongation | | | | | |
| 100%, MPa | 1.1 | 1.7 | 1.6 | 1.5 | 1.4 |
| 300%, MPa | 2.1 | 9.1 | 6.5 | 6.8 | 5.5 |
| 300/100 modulus ratio | 1.9 | 5.2 | 4.1 | 4.4 | 4.0 |
| Ult tensile strength, MPa | 12.4 | 17.5 | 18.1 | 19.7 | 18.6 |
| Ult elongation (%) | 972 | 483 | 608 | 600 | 658 |
| Hardness (Shore A) | | | | | |
| 23° C. | 61 | 64 | 67 | 66 | 63 |
| 100° C. | 51 | 57 | 59 | 58 | 56 |
| Rebound, % | | | | | |
| 23° C. | 40 | 44 | 42 | 43 | 42 |
| 100° C. | 49 | 64 | 60 | 61 | 59 |
| Tear Strength | | | | | |
| 95° C., N | 42 | 99 | 141 | 130 | 137 |
| DIN Abrasion (cc loss) | 191 | 96 | 112 | 107 | 122 |
| Dynamic Stiffness ° C. | | | | | |
| E', MPa | 27.5 | 26.4 | 39.1 | 39.1 | 38 |
| Tan delta | 0.173 | 0.165 | 0.143 | 0.141 | 0.142 |
| 60° C. | | | | | |
| E', MPa | 18.8 | 12.3 | 20 | 19.3 | 19 |
| Tan delta | 0.107 | 0.083 | 0.084 | 0.088 | 0.091 |

Samples for testing were cured 18 minutes at 150° C. It can be seen from Table 2 that Sample D exhibits a higher 300/100 modulus ratio and higher tensile strength as compared to Sample E. This is considered herein to be significant because it indicates that addition of the bis(3-triethoxysilylpropyl) disulfide prior to the 2-hydroxyethyl methacrylate has resulted in a higher modulus ratio which suggests better treadwear (longer wearing tread) for a tire having a tread of the rubber composition of Sample D and the higher tensile strength of Sample D is considered herein to be indicative of a resilient rubber and therefore cooler running for a tire with a tread of the rubber composition of Sample D.

It can also be seen from Table 2 that Sample D has a lower DIN abrasion loss as compared to Control Sample C. This is considered herein to be significant because it indicates that addition of the bis(3-triethoxysilylpropyl) disulfide prior to the 2-hydroxyethyl methacrylate has resulted in an increase in the 300/100 modulus ratio and also improved DIN abrasion, which is indicative of improved treadwear (longer wearing tread) for a tire having a tread of the rubber composition of Sample D.

It can be seen that the order of addition utilized for the preparation of Sample D, namely, the addition of the bis(3-triethoxysilylpropyl) disulfide in the first, non-productive mixing stage followed by the addition of the 2-hydroxyethyl methacrylate in the second, non-productive mixing stage as compared to the reversed order of addition for Sample E resulted in a rubber composition having a higher 300% modulus value, lower ultimate elongation value and lower DIN abrasion value. This is considered herein to be significant where such values are desired for a tire having a tread of the rubber composition of Sample D.

EXAMPLE II

Two rubber compositions comprised of natural cis 1,4-polyisoprene and styrene/butadiene elastomers are prepared for which a coupling agent as 2-hydroxyethyl methacrylate was added for one rubber composition and referred to herein as Sample G and for which the coupling agent was not added to the other rubber and referred to herein as Control Sample F.

Both Control Sample F and Sample G were mixed as outlined in Table 3.

TABLE 3

| Material | Sample F Control | Sample G |
|---|---|---|
| Non-productive Mixing Step 1 | | |
| Natural rubber[1] | 50 | 50 |
| Styrene/butadiene rubber[2] | 50 | 50 |
| Carbon black[3] | 43 | 43 |
| Processing oil[4] | 5.8 | 5.8 |
| Antioxidant/antiozonant[5] | 3.3 | 3.3 |
| Stearic acid | 2 | 2 |
| Zinc oxide | 2.5 | 2.5 |
| Non-productive Mixing Step 2 | | |
| Silica[6] | 17 | 17 |
| Processing oil[4] | 3 | 3 |
| Non-silane coupler (50% active)[7] | 0 | 3.5 |
| Productive Mixing Step | | |
| Sulfur | 1.3 | 1.3 |
| Accelerator(s)[8] | 1.1 | 1.1 |

[1]Natural rubber
[2]Styrene/butadiene rubber obtained as SLF1216 from The Goodyear Tire & Rubber Company
[3]ASTM N299
[4]Naphthenic/parrafinic rubber processing oil
[5]P-phenylenediamine type
[6]Obtained as Hi-Sil ® 210 from PPG Industries

TABLE 3-continued

| Material | Sample F Control | Sample G |
|---|---|---|

[7] 2-hydroxyethyl methacrylate obtained from the Aldrich Company and thereafter dispersed on carbon black on a 50/50 weight basis
[8] Sulfenamide type The Samples were cured as in Example I and various of their physical properties are reported in Table 4.

TABLE 4

| Material | Sample F Control | Sample G |
|---|---|---|
| Non-silane coupler (50% active) | 0 | 3.5 |
| Rheometer 150° C. | | |
| Maximum torque | 13.3 | 13.7 |
| Minimum torque | 2.7 | 2.7 |
| Delta torque | 10.6 | 11 |
| T90 (min.) | 13.3 | 12.9 |
| Modulus/Tensile/Elongation | | |
| 100%, MPa | 1.7 | 1.7 |
| 300%, MPa | 9 | 9.6 |
| 300/100 modulus ratio | 5.4 | 5.7 |
| Ult tensile strength, MPa | 17.1 | 18.3 |
| Ult elongation (%) | 475 | 483 |
| Rebound | | |
| 23° C. | 48 | 47 |
| 100° C. | 61 | 60 |
| Hardness (Shore A) | | |
| 23° C. | 61 | 61 |
| 100° C. | 52 | 52 |
| Tear Resistance N | | |
| Average, 95° C. | 80 | 100 |
| DIN Abrasion (cc loss) | 120 | 122 |
| Dynamic Stiffness ° C. | | |
| E', MPa | 18.3 | 10.6 |
| Tan delta | 0.17 | 0.16 |
| 60° C. | | |
| E', MPa | 6.90 | 3.2 |
| Tan delta | 0.092 | 0.11 |

It can be seen from Table 4 that an improved 300/100 Modulus ratio and a higher ultimate tensile strength is observed for Sample G as compared to Sample F. This is considered herein to be significant because this is indicative of improved treadwear (less wear) for a tire having a tread of such rubber composition.

It can also be seen from Table 4 that Sample G also shows greater resistance to tear as compared to Sample F. This is considered herein to be significant because improved tear resistance for a tire component historically is expected to give improved tire durability.

While various embodiments are disclosed herein for practicing the invention, it will be apparent to those skilled in this art that various changes and modifications may be made therein without departing from the spirit or scope of the invention.

What is claimed is:

1. A tire which contains at least one component comprised of a rubber composition which comprises
(A) 100 parts by weight of at least one diene-based elastomer,
(B) about 25 to about 100 phr of particulate reinforcing filler comprised of
  (1) from zero to about 100 phr of synthetic amorphous silica aggregates and, correspondingly,
  (2) from zero to about 75 phr of at least one of carbon black and silica treated carbon black having domains of silica on its surface;
  wherein said synthetic amorphous silica aggregates and said domains of silica on the surface of said silica treated carbon black contain hydroxyl groups on their surface; and
(C) from about 0.5 to about 10 phr of a coupling agent as 2-hydroxyethyl methacrylate or a combination of 2-hydroxyethyl methacrylate and an alkoxysilyl polysulfide material in a weight ratio of said 2-hydroxyethyl methacrylate to said alkoxysilyl polysulfide material is in a range of from about 1/2 to about 2/1 and wherein said alkoxysilyl polysulfide material is of the general formula (I)

$$(RO)_3-Si-R'-S_x-R'-Si-(OR)_3 \quad (I)$$

wherein R is selected from methyl and ethyl radicals, R' is an alkylene radical having from 1 to 12 carbon atoms and x represents the number of connecting sulfur atoms in the polysulfidic bridge as being a value in a range of from 2 to 6 wherein the value of x for said polysulfide material is an average of from 2 to 2.6 or from 3.5 to 4;

wherein said 2-hydroxyethyl methacrylate and said alkoxysilyl polysulfide material of general formula (I) are mixed with said elastomer(s), by:
  (1) mixing said 2-hydroxyethyl methacrylate or both of said 2-hydroxyethyl methacrylate and said alkoxysilyl polysulfide material with said diene-based elastomer(s) and said particulate reinforcing filler, or
  (2) mixing said 2-hydroxyethyl methacrylate or a combination of both of said 2-hydroxyethyl methacrylate and said alkoxysilyl polysulfide material with said diene-based elastomer(s) and said particulate reinforcing filler, wherein at least one of said 2-hydroxyethyl methacrylate and said alkoxysilyl polysulfide material has been pre-reacted with said carbon black, or
  (3) mixing said 2-hydroxyethyl methacrylate or a combination of both of said 2-hydroxyethyl methacrylate and said alkoxysilyl polysulfide material with said elastomer(s) and said particulate reinforcing filler, wherein at least one of said 2-hydroxyethyl methacrylate and said alkoxysilyl polysulfide material has been pre-reacted with said silica treated carbon black to form a silica treated carbon black composite thereof, or
  (4) mixing said 2-hydroxyethyl methacrylate or a combination of both of said 2-hydroxyethyl methacrylate and said alkoxysilyl polysulfide material with said elastomer(s) and said particulate reinforcing filler, wherein at least one of said 2-hydroxyethyl methacrylate and said alkoxysilyl polysulfide material has been pre-reacted with
    (a) a synthetic precipitated silica or
    (b) an aqueous dispersion of colloidal silica particles from which a precipitated silica is recovered to form a silica composite thereof,
  (5) mixing said 2-hydroxyethyl methacrylate and said alkoxysilyl polysulfide material with said elastomer(s) and said particulate reinforcing filler according to one or more of said steps (1), (2), (3) or (4) wherein said particulate reinforcing filler includes at least one of said synthetic amorphous silica aggregates and said silica treated carbon black which has been pre-hydrophobated prior to mixing with said elastomers with an alkylsilane of the general formula (II):

$$X_n\text{—}Si\text{—}R_{4-n} \quad (II)$$

wherein X is a radical selected from methoxy and ethoxy radicals, or from halogen radicals selected from at least one of chlorine and bromine radicals; R is an alkyl radical having from 1 to 18 carbon atoms; and n is an integer of 1 through 3, or (6) mixing said 2-hydroxyethyl methacrylate, or a combination of both of said 2-hydroxyethyl methacrylate and said alkoxysilyl polysulfide material, and an alkylsilane of the said formula (II) with said a diene-based elastomer(s) and particulate reinforcing filler, or (7) mixing said 2-hydroxyethyl methacrylate, or a combination of both of said 2-hydroxyethyl methacrylate and said alkoxysilyl polysulfide material and said alkylsilane of formula (II) with said diene-based elastomer(s) and said particulate reinforcing filler, wherein said 2-hydroxyethyl methacrylate, said alkoxysilyl polysulfide material and said alkylsilane of formula (II) have all been pre-reacted with (a) a synthetic precipitated silica, or (b) an aqueous dispersion of colloidal silica particles from which a preciipitated silica is recovered to form a silica composite thereof.

2. The tire of claim 1 said particulate reinforcing filler is comprised of synthetic amorphous silica aggregates in a form of precipitated silica and carbon black exclusive of silica-treated carbon black and is comprised of at least about 5 phr of carbon black and at least 10 phr of precipitated silica.

3. The tire of claim 2 where a combination of said alkoxysilyl polysulfide material of formula (I) and said 2-hydroxyethyl methacrylate is used, said alkoxysilyl polysulfide material is blended with said elastomer(s) prior to said 2-hydroxyethyl methacrylate.

4. The tire of claim 2 wherein said alkoxysilyl polysulfide material of the said general formula (I) is a bis(3-triethoxysilylpropyl) polysulfide.

5. The tire of claim 2 wherein said 2-hydroxyethyl methacrylate is reacted with the surface of said precipitated silica in situ within the elastomer host.

6. The tire of claim 2 wherein said 2-hydroxyethyl methacrylate together with an alkylsiane of the said general formula (II) are reacted with the surface of said precipitated silica in situ within the diene-based elastomer host.

7. The tire of claim 2 wherein said 2-hydroxyethyl methacrylate is provided as a pre-formed composite, prior to addition to said diene-based elastomer(s), of said precipitated silica and said 2-hydroxyethyl methacrylate.

8. The tire of claim 2 wherein said pre-formed composite is formed (A) by reaction of said 2-hydroxyethyl methacrylate and/or alkylsiane with said precipitated silica or (B) by reaction of the 2-hydroxyethyl methacrylate alkoxysilyl polysulfide material, and hydrophobating agent of the said general formula (II) with the formative colloidal silica particles prior or during their aggregation in the precipitation process.

9. The tire of claim 2 wherein said rubber composition comprises from about 35 to about 70 phr of a particulate reinforcing filler comprised of about 10 to about 70 phr of said precipitated silica and about 10 to about 60 phr of said carbon black.

10. The tire of claim 2 wherein said diene-based elastomer(s) is selected from homopolymers and copolymers of monomers selected from isoprene and 1,3-butadiene and copolymers of at least one diene selected from isoprene and 1,3-butadiene and a vinyl aromatic compound selected from styrene and alphamethyl styrene.

11. The tire of claim 2 wherein said diene-based elastomer(s) is comprised of at least one of cis 1,4-polyisoprene, cis 1,4-polybutadiene, styrene/butadine copolymers prepared by aqueous emulsion polymerization), styrene/butadiene copolymers prepared by organic solution polymerization, medium vinyl polybutadiene having a vinyl 1,2-content in a range of about 15 to about 90 percent, isoprene/butadiene copolymers, styrene/isoprene/butadiene terpolymers and tin coupled elastomers selected from at least one of tin coupled organic solution prepared styrene/butadiene co-polymers, isoprene/butadiene copolymers, styrene/isoprene copolymers, polybutadiene and styrene/isoprene/butadiene terpolymers.

12. The tire of claim 1 wherein said synthetic amorphous silica aggregates are selected from precipitated silica and fumed silica.

13. The tire of claim 1 wherein said synthetic amorphous silica aggregates are comprised of aggregates of precipitated silica.

14. The tire of claim 1 wherein said particulate reinforcing filler is a combination of synthetic amorphous silica aggregates in a form of precipitated silica and carbon black.

15. The tire of claim 2 wherein said particulate reinforcing filler is a silica treated carbon black derived from (A) treating carbon black with an alkoxy silane or (B) co-fuming silca and carbon black at an elevated temperature.

16. The tire of claim 1 wherein said component is a tire tread.

17. The tire of claim 2 wherein said component is a tire tread.

18. The tire of claim 3 wherein said component is a tire tread.

* * * * *